(No Model.)

R. L. PHELPS.

GRAIN CUTTING MACHINE.

No. 287,464. Patented Oct. 30, 1883.

Witnesses
George R Robinson
J. H. Dussel.

Inventor
Rodney L. Phelps
by Bradford Howland
Attorney

UNITED STATES PATENT OFFICE.

RODNEY L. PHELPS, OF RAVENNA, OHIO.

GRAIN-CUTTING MACHINE.

SPECIFICATION forming part of Letters Patent No. 287,464, dated October 30, 1883.

Application filed April 13, 1883. (No model.)

*To all whom it may concern:*

Be it known that I, RODNEY L. PHELPS, of Ravenna, Portage county, Ohio, have invented a new and useful Improvement in Grain-Cutting Machines, of which the following is a specification.

My invention relates to a rotating grain-carrier formed with both annular and longitudinal grooves, in combination with cutters, and a hopper having guides or partitions across its bottom, forming slots of such width as to allow of but one kernel at a time entering each longitudinal groove at the bottom of each slot.

The object of the invention is to cut oats or other grain into coarse meal of uniform-sized particles.

Figure 1:
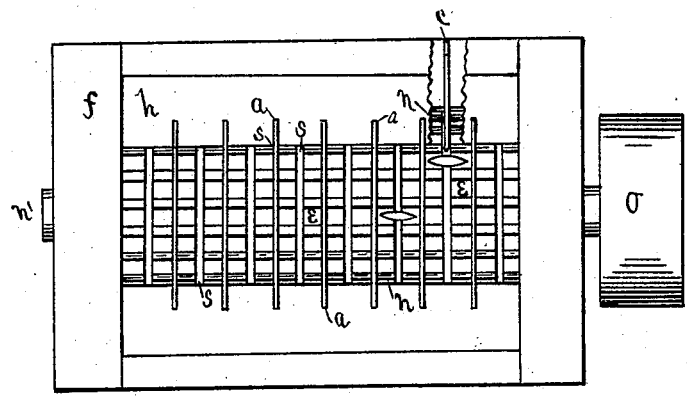
Figure 2:
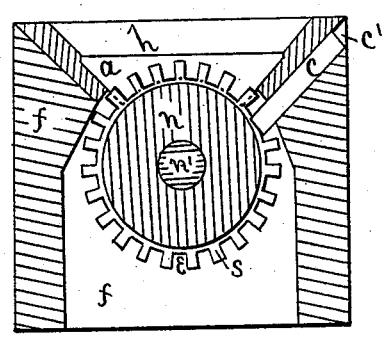

In the drawings forming a part of this specification, Figure 1 is a plan representing a part of one side of the hopper as broken away to show one of the cutters. Fig. 2 is a cross-section.

I herein describe a cylindrical grain-carrier; but it may be in the form of an endless chain, if deemed desirable.

Cylinder $n$ rotates in frame $f$ by means of power applied to pulley $o$ on shaft $n'$. The cylinder is formed with longitudinal grooves $e$, of suitable width and depth to hold kernels of grain lengthwise of them. It is also formed with annular grooves $s$, of a distance apart about equal to half the length of a kernel.

Across the bottom of hopper $h$ are partitions or guides $a$, which enter alternate annular grooves $s$. These guides $a$ divide grooves $e$ into sections of sufficient length to hold but one kernel. Cutters $c$, in suitable grooves, $c'$, in frame $f$, under one side of hopper $h$, project into the alternate annular grooves $s$, which cross the sections of grooves $e$ midway between guides $a$. The grain fed into hopper $h$ falls into the sections of grooves $e$, between guides $a$, and is carried by the rotating cylinder $n$ under the lower edge of the hopper, where each kernel is severed into two substantially equal parts. As the cylinder continues to rotate, the severed particles are discharged beneath. If it be desired to sever the kernels into shorter particles, there may be several annular grooves $s$ crossing grooves $e$, between guides $a$, and corresponding cutters. It is not necessary that guides $a$ should extend down into grooves $s$; but I deem it preferable to so arrange them to prevent sliding of the kernels in grooves $e$.

I claim as my invention—

1. In a grain-cutting machine, a carrier formed with longitudinal grooves $e$ and annular grooves $s$, in combination with guides $a$, forming slots in the bottom of hopper $h$, of sufficient width to permit of but one kernel at a time entering a groove, $e$, lengthwise, at the bottom of each slot, and with cutters $c$ in the grooves $s$ at the bottoms of the slots, substantially as described.

2. In a grain-cutting machine, a carrier formed with longitudinal grooves $e$ and annular grooves $s$, in combination with cutters $c$ and guides $a$ at the bottom of hopper $h$, the guides entering grooves $s$, to divide grooves $e$ into sections of sufficient length for only one kernel to lie lengthwise in each section, the cutters $c$ also entering grooves $s$ other than those occupied by said guides, substantially as described.

RODNEY L. PHELPS.

Witnesses:
 BRADFORD HOWLAND,
 GEO. F. ROBINSON.